United States Patent [19]

Unger et al.

[11] Patent Number: 4,752,249
[45] Date of Patent: Jun. 21, 1988

[54] ACCESS PANEL AND FANNING STRIP FOR TELEPHONE DISTRIBUTION FRAME

[75] Inventors: John J. Unger, Elmhurst; Louis Suffi, Westchester, both of Ill.

[73] Assignee: Reliance Comm/Tec Corporation, Chicago, Ill.

[21] Appl. No.: 8,055

[22] Filed: Jan. 16, 1987

Related U.S. Application Data

[63] Continuation of Ser. No. 711,396, Mar. 13, 1985, abandoned, which is a continuation-in-part of Ser. No. 591,765, Mar. 21, 1984, abandoned.

[51] Int. Cl.⁴ .............................................. H01R 9/00
[52] U.S. Cl. ................................... 439/718; 439/719; 379/327
[58] Field of Search ............ 339/198 J, 198 H, 198 R, 339/198 GA, , 198 G, 18 R, 18 B, 18 C, 18 P; 179/91 R, 98, 178, 179

[56] References Cited

U.S. PATENT DOCUMENTS

| 1,828,455 | 10/1931 | Borgmann | 179/91 R |
| 2,597,286 | 5/1952 | Burgess | 339/198 J |
| 4,037,910 | 7/1977 | Paluch | 339/198 R |
| 4,057,692 | 11/1977 | De Bortolic et al. | 179/98 |
| 4,331,839 | 5/1982 | Baumbach | 179/98 |
| 4,516,818 | 5/1985 | Johnston et al. | 339/198 R |

Primary Examiner—Gil Weidenfeld
Assistant Examiner—Thomas M. Kline
Attorney, Agent, or Firm—Michael M. Rickin

[57] ABSTRACT

A side access panel and associated rear fanning strip for enclosing the otherwise open side of a telephone distribution frame connector assembly. The fanning strip interconnects a rear facing edge of the access panel to a rear edge portion of assembly without the use of fasteners. An engaging means such as a clamping strip may also be included as part of the access panel to engage a front facing edge of the assembly to provide a more secure mounting of the panel over the open side.

15 Claims, 6 Drawing Sheets

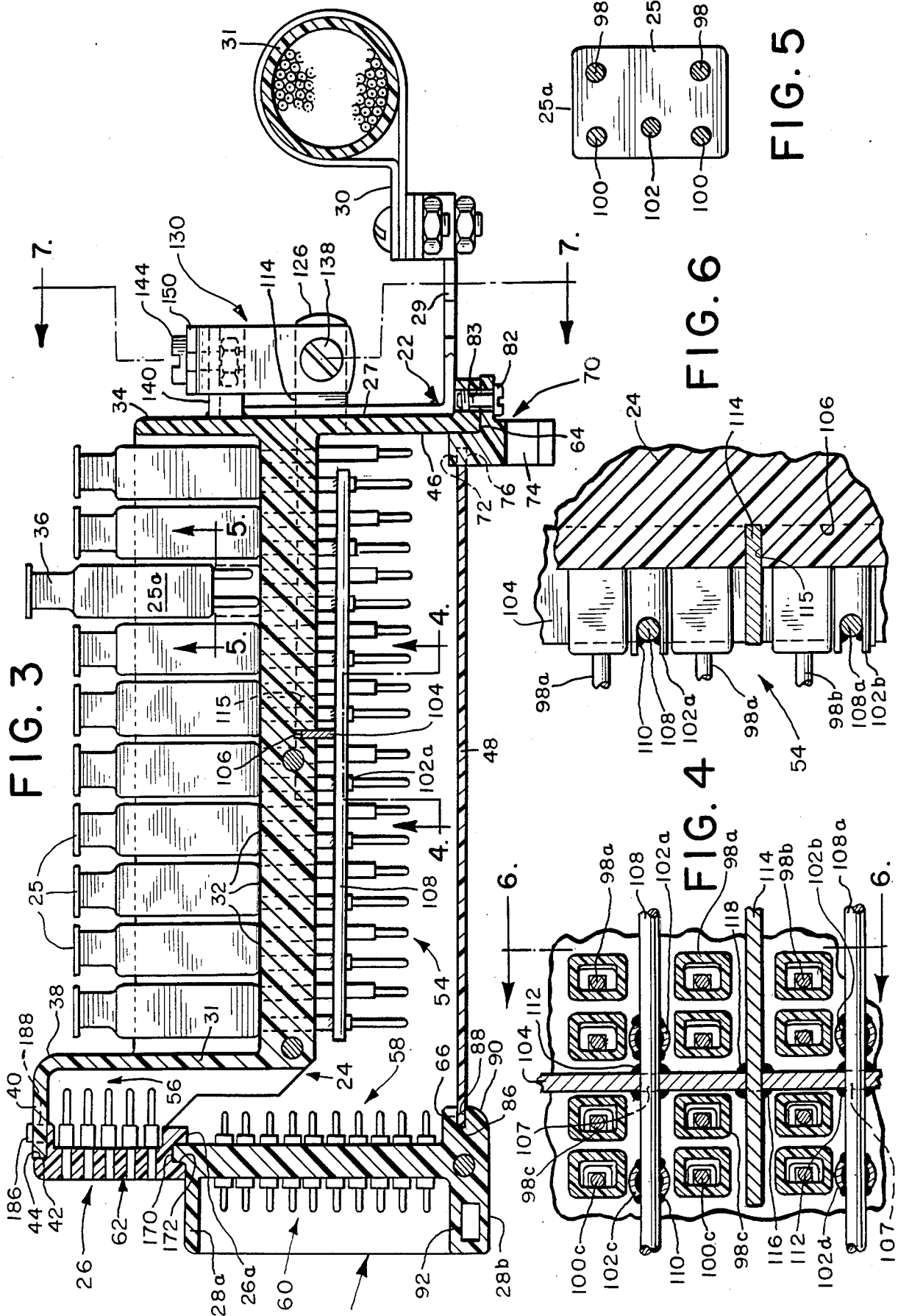

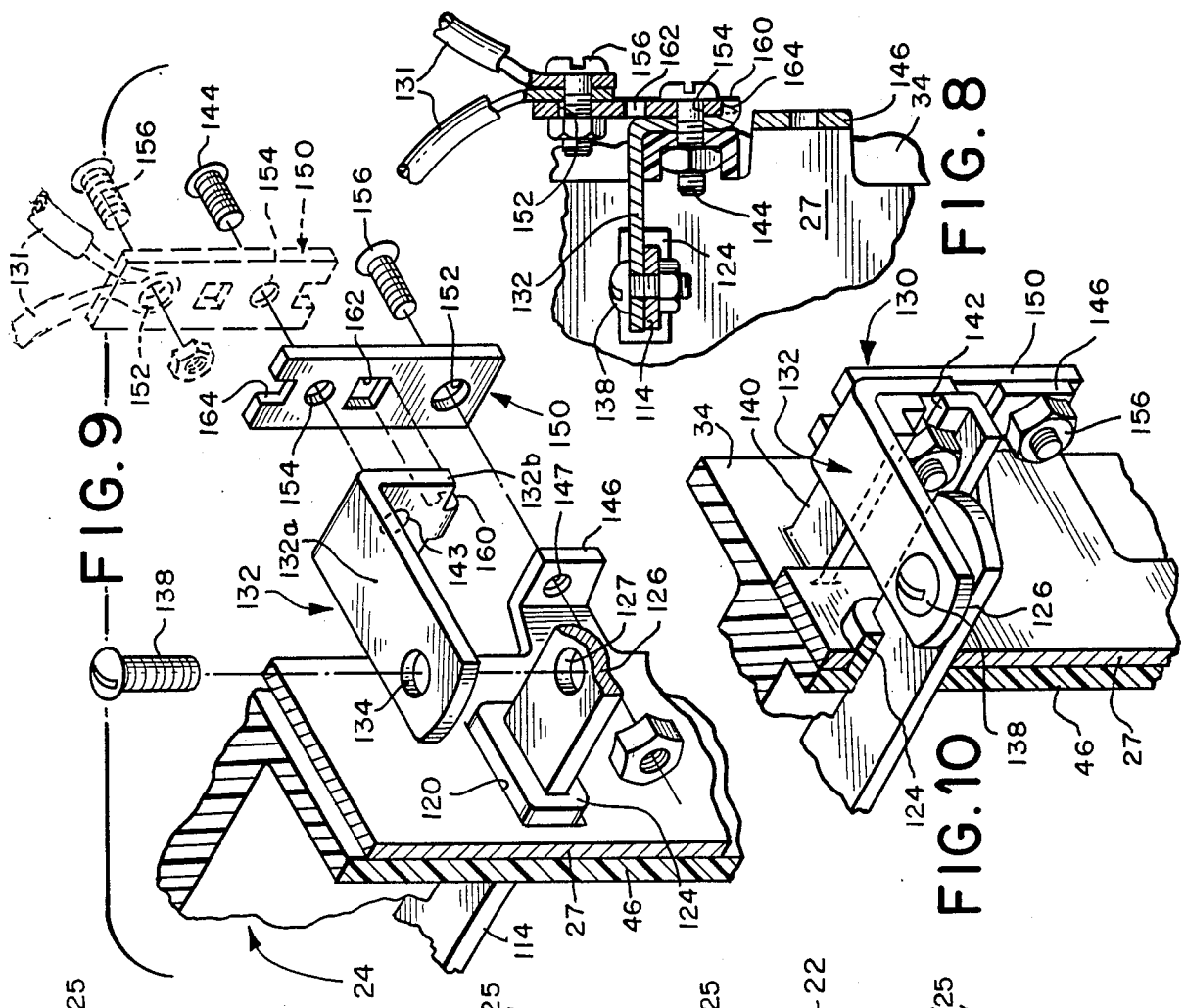

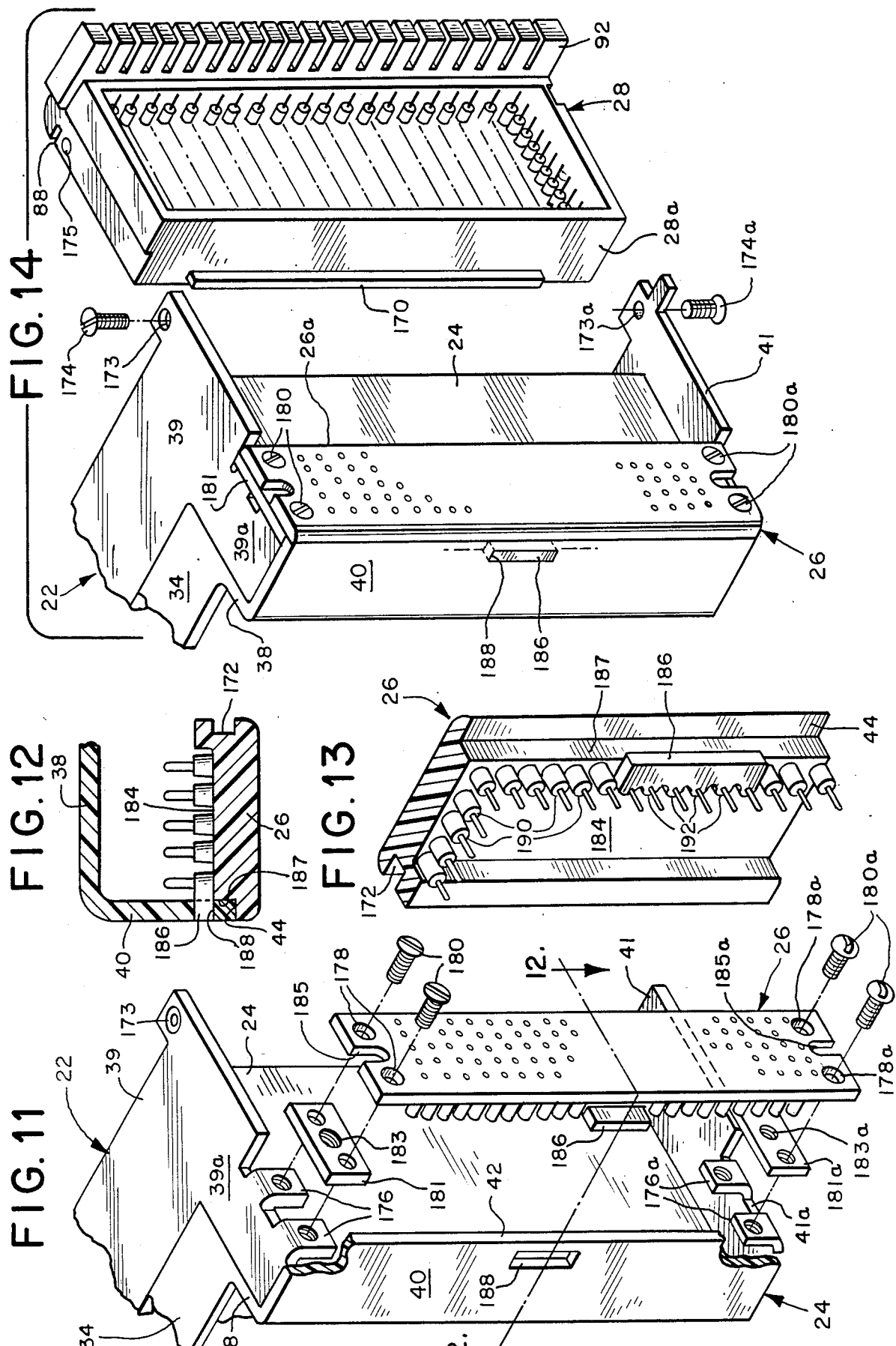

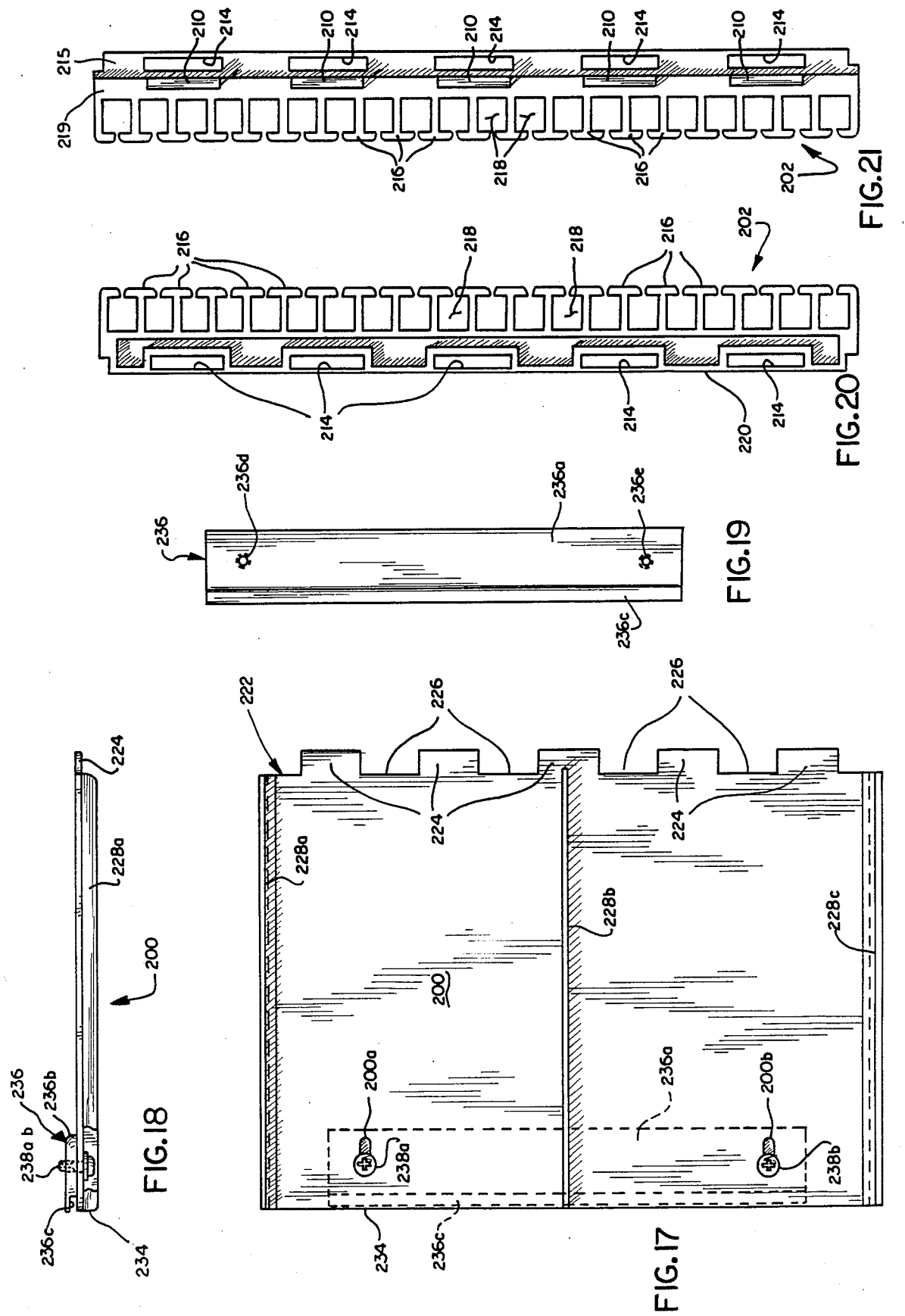

ACCESS PANEL AND FANNING STRIP FOR TELEPHONE DISTRIBUTION FRAME

This is a continuation of co-pending application Ser. No. 711,396 filed on Mar. 13, 1985, now abandoned, which is a continuation-in-part of our copending U.S. application Ser. No. 591,765 filed Mar. 21, 1984 for "Telephone Distribution Frame Connector Assembly" now abandoned.

BACKGROUND OF THE INVENTION

This invention relates to a telephone circuit distribution system and more particularly to a telephone distribution frame connector assembly having overload protector modules that provide line protection for inside plant equipment such as central office switching equipment.

Telephone distribution frame connectors, or panels as they are sometimes called, of the type having plug-in modules are generally known in the telephone art. In such connectors outside lines are connected to in-plant or central office switching equipment through protector modules which protect the inside equipment from damage due to over-voltage or over-current faults. These connectors or panels are mounted on distribution frames which are generally positioned close together. Space is often at a premium in such installations and accordingly, down-sizing or other space saving measures in the design of the connector assembly is a continuing objective.

A typical such connector assembly includes a module field which includes suitable connectors and terminals for receiving a plurality of overload protectors, a test field for receiving a test shoe to test the integrity of the connections, and an equipment field for terminating conductors from the inside plane equipment or central office switching equipment. The incoming lines are generally terminated either directly or through a cable stub to the terminals of the module field, which are respectively coupled to the appropriate terminals of receptacles which receive the respective overload protector modules. In this regard, a protector module is provided for each line pair being terminated in the module field. Accordingly, the protector modules are coupled between the incoming lines and the equipment field to provide a surge path to ground for the respective lines when an over-voltage fault or a current surge appears. In addition, the test field comprises a series of terminals coupled to the respective incoming lines. Thus, the connector assembly provides a protected interface between the incoming lines and inside plant lines and equipment, as well as providing a convenient place to test the various lines.

In typical arrangements of the foregoing types, wire conductors are routed between the various fields or groups of terminals in order to provide for the proper circuitry connections. These wire conductors may be wrapped or soldered or otherwise joined to the respective terminals, and they are generally routed behind the face of a module field "block" at which the modules are plugged in. Thus, these wire conductors are sometimes referred to as "back plane" wiring, that is, wiring which is internal to the connector assembly.

In a typical connector assembly, a conductive metallic frame member is utilized to mount the module field, test field and equipment field in the desired relative orientations, and also to mount the connector assembly to the main distribution frame. In this regard, one or more field "blocks" are generally formed as by molding or another suitable process, from a suitable moldable non-conductive material, such as a plastic material. Generally speaking, this mounting of the connector assembly to the distribution frame and orientation of fields is preferable so as to provide ready access firstly to the equipment field and test field and secondarily to the modules side of the module field. Accordingly, many connector assemblies orient or mount an equipment field block and/or test field block to form the front side of the connector assembly when mounted to the main distribution frame. The module side of the module field block is then mounted to one or the other side of the connector assembly, while a suitable access panel or cover plate is utilized to cover the back plane wiring thereon. The frame member and/or an additional wall portion of the module field block generally form a back or rear wall of the connector assembly. Accordingly, the connector assembly generally provides a housing or enclosure for enclosing the back plane wiring.

Many prior art connector assemblies provide a suitable ground path for ground points or terminals in the back plane, such as for the surge path for the overload protectors, directly to the metallic frame member which is in conductive contact with the distribution frame to provide what is generally called a "frame ground." However, in many installations it may be desirable to provide a current path to some ground point such as an "absolute" ground of a building or other installation which is isolated or separate from the frame ground. Such an alternate ground is generally referred to as an "isolated ground." Many connector assemblies heretofore in use have included permanent internal electrical connection to the frame ground. Such assemblies have generally been incapable of field modification to achieve such an isolated ground connection. Moreover, such connector assemblies have often been incapable of such ground path modification even during the manufacturing process, without substantial changes to the internal construction thereof, at great expense and time and labor.

An additional problem has arisen with respect to the integrity of the access panel or back plane cover panel in connector assemblies heretofore in use. In this regard, typical connector assemblies accommodate as many as 100 line pairs and hence mount as many as 100 associated overload protector modules. Accordingly, while access is necessary to the back plane wiring from time to time, the cover should nonetheless provide a relatively flat, secure closure, to prevent the ingress of wire clippings, dirt or the like when in service. Many connector assemblies heretofore in use have failed to provide a suitable cover and related assembly which may be reliably secured in this fashion and yet relatively simply removed for access to the back plane wiring.

A related problem has been the provision in some prior art assemblies of the test field block and equipment field block as a single integral piece to form the front surface of the connector assembly. In this regard, it is often desirable to provide equipment field blocks in a variety of configurations—for example, utilizing insulation displacement type connectors as opposed to wire wrap type of connectors, or the like. While such modification is generally not done in the field, it is relatively common to provide blocks containing the differing types of terminals for different installations. Heretofore, this has been relatively expensive, requiring duplicate tooling and parts costs for the test field portion of the integral block, which is usually of the same configuration in all installations.

Accordingly, it has been proposed to utilize separate blocks for the test field and equipment field. However, the test field comprises numerous relatively small terminal members and hence may present a relatively long, narrow surface. This block must also accommodate a removable mating connector or "test shoe" to accomplish testing of the connections. Accordingly, we encountered problems in maintaining the test field block and equipment field block in substantially flat condition, and in side-by-side alignment at all times, especially upon repeated engagement and disengagement of the test shoe. In this regard, we also encountered some problems of bowing out of the test field block, especially toward a medial portion thereof.

OBJECTS AND SUMMARY OF THE INVENTION

Accordingly, it is a general object of this invention to provide a telephone distribution frame connector assembly for the general purposes previously stated while substantially avoiding the above-mentioned problems.

The further object is to provide a telephone distribution frame connector assembly which is relatively simple and inexpensive and yet when installed allows for easy removal of the access panel.

In accordance with one aspect of the invention there is provided a telephone distribution frame connector assembly for connecting incoming lines to inside equipment and comprising means forming a module field, a test field and an equipment field, a frame member for mounting the fields to a telephone distribution frame, and means for mounting the fields to the frame member to define a generally rectilinear enclosure having one open side. An access panel is provided for normally covering the one open side of the connector assembly. A fastenerless rear fanning strip removably interconnects with both a rear facing portion of the panel and a first peripheral edge portion of the enclosure open side.

BRIEF DESCRIPTION OF THE DRAWINGS

The foregoing, as well as other objects, features and advantages of the invention will be more readily appreciated upon reading the following detailed description of the illustrated embodiment, together with reference to the several figures of drawings, wherein:

FIG. 3 is a sectional view taken generally along the line 3—3 of FIG. 1;

FIG. 4 is an enlarged fragmentary sectional view taken generally along the line 4—4 of FIG. 3;

FIG. 5 is a bottom view of a single protector module, taken generally along the line 5—5 of FIG. 3;

FIG. 6 is a view taken generally along the line 6—6 of FIG. 4;

FIG. 7 is a rear view, partially in section, of the assembly of the invention, partially broken away, and taken generally along the line 7—7 of FIG. 3;

FIG. 8 is a fragmentary view illustrating a moved position of ground selecting elements of FIG. 7;

FIG. 9 is an exploded perspective view illustrating further features of the ground selecting elements of FIGS. 7 and 8 and the assembly of these elements;

FIG. 10 is a fragmentary perspective view of a portion of FIG. 7, illustrating further features of the ground selecting elements thereof;

FIG. 11 is an exploded perspective view of elements of the front of the assembly of FIG. 1, and illustrating further details thereof;

FIG. 12 is an enlarged sectional view taken generally along the line 12—12 of FIG. 11;

FIG. 13 is an enlarged fragmentary perspective view, illustrating further details of one of the elements of FIG. 1;

FIG. 14 is a partially exploded perspective view of the front, left-hand portion of the assembly of FIG. 1;

FIG. 17 is a front view of the access panel of the present invention;

FIG. 18 is a top view of the access panel of FIG. 17;

FIG. 19 is a front view of the clamping strip included in the access panel of FIG. 17;

FIG. 20 is a front view of the rear fanning strip of the present invention; and

FIG. 21 is a rear view of the rear fanning strip.

DETAILED DESCRIPTION OF THE ILLUSTRATED EMBODIMENT

Figure 1:
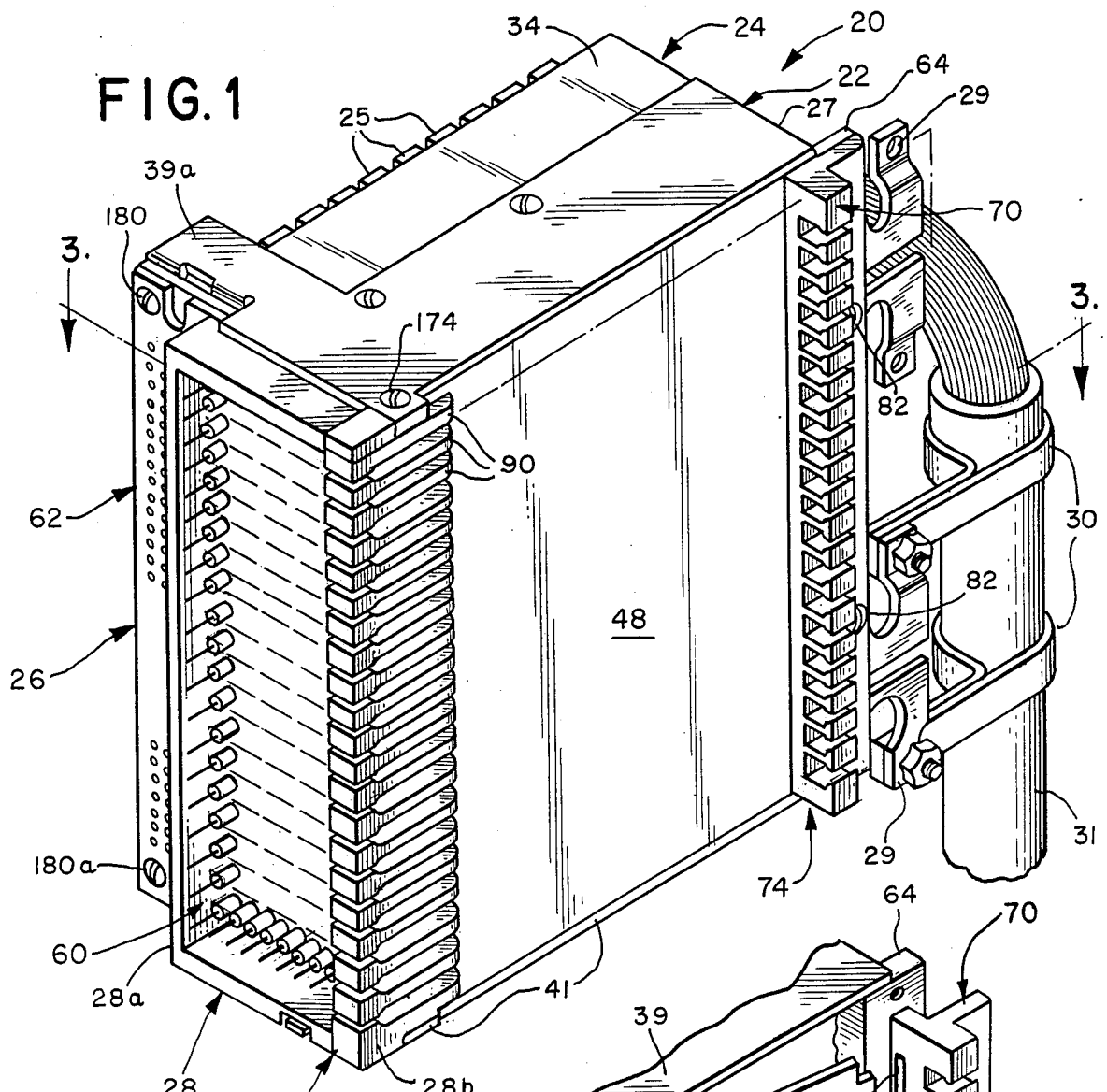
FIG. 1 is a front perspective view of a telephone distribution frame connector assembly in accordance with the invention in assembled condition.

Referring now to the drawings and initially to FIG. 1 and FIG. 3, there is shown a connector assembly designated generally by the reference numeral 20. This assembly comprises a generally C-shaped frame member 22 which supports or mounts the remaining components of the assembly. In this regard, a module field block 24 mounts at an outer side thereof a plurality of over-voltage or surge protector modules 25. As will be seen later, each of these modules 25 receives an outside line and a corresponding line pair from inside telephone equipment or the like and provides a surge or discharge path to ground to protect the inside equipment from overvoltage or sudden current surges on the outside lines.

A test field block 26 and an equipment field block 28 are mounted in side-by-side condition to the frame member 22 and together define the front side of the assembly. A rear side of assembly is defined generally by a rear wall portion 27 of the frame member 22. This wall 27 supports outwardly extending ears or tabs 29 which may be utilized to mount suitable clamps 30 for receiving an incoming cable or cable stub 31. Others of these ears or tabs 29 are used to mount the entire assembly 20 to a telephone distribution frame (not shown), which receives a plurality of similar connector assemblies to form a distribution system.

In this regard, and referring also to FIG. 3, it will be seen that the module field block 24 includes receptacles 32 to mount or receive the protector modules 25. The opposite or inner side is provided with a plurality of terminals 54 corresponding respectively to the terminals of the modules 25, and is generally referred to in the art as the "back plane." The module field block also defines an upstanding peripheral wall portion 34 which surrounds the modules 25 on four sides. The modules 25 may be removed and inserted with respect to receptacles 32 by grasping outer ends 36 thereof as illustrated for the module 25a. It will be noted that the front side of the raised peripheral wall 32 of the module field block 24 is provided with an integral extension 38 which flares outwardly at generally a right-angle to form a side wall portion 40, further defining a portion of the left-hand side of the assembly 20. This side wall 40 terminates at an edge 42. A corresponding outwardly projecting shoulder portion or edge 44 of the test field block 26 abuts and overlies this edge 42.

It will also be noted that the module field block 24 also includes an additional or rear wall portion 46 which generally forms an extension of the rear portion of upstanding wall portion 34 and thus forms a rear wall of the assembly 20. It will be seen that the assembly thus far described generally defines an enclosure, with test field block 26 and equipment field block 28 forming a front side thereof, and module field block 24 forming a left-hand and rear side thereof. The top and bottom of this enclosue are defined respectively by symmetrical upper and lower side portions 39, 41 of the C-shaped frame member 22. In this regard, the upper side portion 39 is best viewed in FIG. 1, it being understood that the lower side portion 41 is substantially a mirror image thereof. The last, otherwise open, right side is normally covered by an access panel 48.

As previously indicated, each of the field blocks 24, 26 and 28 includes a plurality of terminals or connector members on an outer surface for receiving conductors or mating connectors. In this regard, the modules 25 mate with the connectors carried in the receptacles 32 of module field block 24.

Outside lines enter from the cable or stub 31 by way of a plurality of through aligned openings 50, 52 defined respectively in the rear side of the frame member 22, as best seen in FIG. 7. In this regard, it will be noted that the rear portion 27 of the frame member 22 overlies a major portion of the rear wall 46 of the module field block 24. Preferably, the openings 52 include raised peripheral lip portions 53 to facilitate alignment of the module field block with the frame. This arrangement also holds wires running therethrough away from the metal frame, to avoid possible abrasion or damage to the wires by the edges of the openings 50 of the metal frame.

As previously mentioned, these outside lines are connected to in-plant or central office switching equipment through the protector modules 25, and these connections are accomplished at selected terminals of the back plane, as designated generally by reference numeral 54. In this regard, additional terminals for the back plane wiring are also defined on the interior sides of the test field block 26 and the equipment field block 28, these latter terminals being respectively designated by general reference numerals 56 and 58.

In operation, the wiring is then carried from others of the terminals 54 to the desired terminals 58 of the equipment field block 28, the connections thereof to inside equipment being completed at the outer face thereof which bears corresponding terminals indicated generally by reference numeral 60. The terminals 56 of the test field block 26 are generally coupled to those terminals 54 which receive the incoming lines to permit a convenient place to test these various lines. In this regard, a suitable complementary test shoe (not shown) may be interfitted over the exterior of the test field block 26 to accomplish such testing.

In accordance with one feature of the invention, the access panel 48 is provided with novel panel securing or hold-down means for removably, securely engaging a marginal peripheral portion thereof in a substantially flat condition against a peripheral edge portion of the otherwise open side defined by the enclosure or assembly 20. In this regard, this otherwise open side is generally defined by an outer edge portion 64 of the module field block wall 46, by an outer edge portion 66 of the equipment field block 28, and by edge portions of upper and lower walls 39, 41 of the C-shaped frame member 22.

Figure 2:
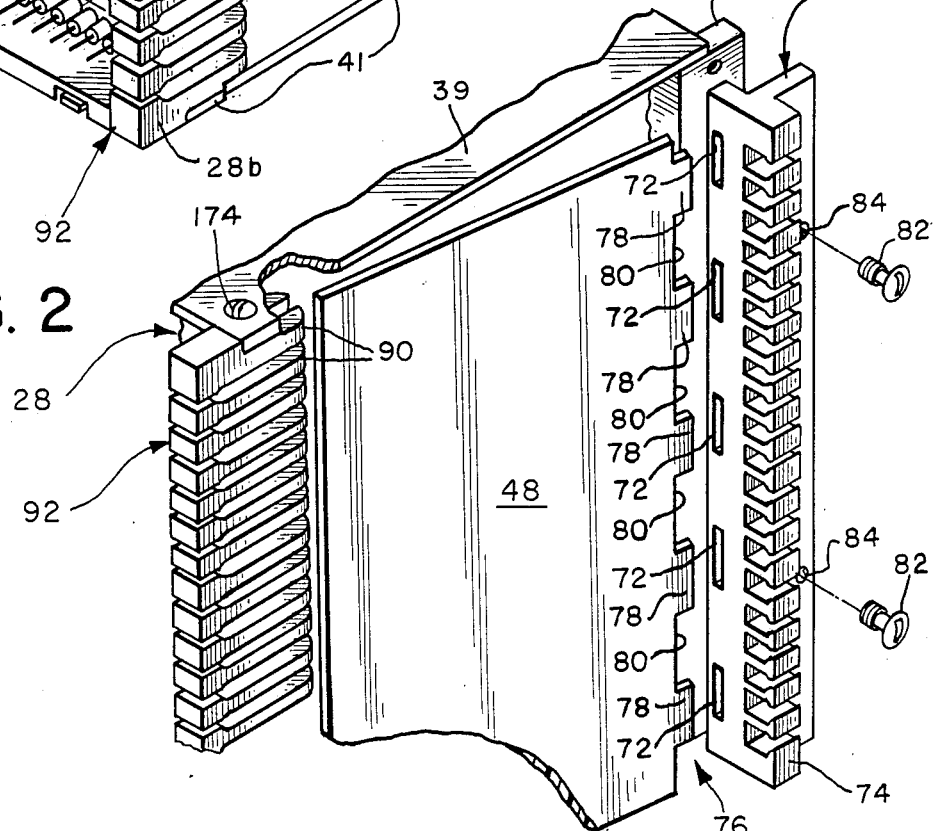
FIG. 2 is an exploded fragmentary view illustrating the assembly of a cover portion of the assembly of FIG. 1.
Figure 15:
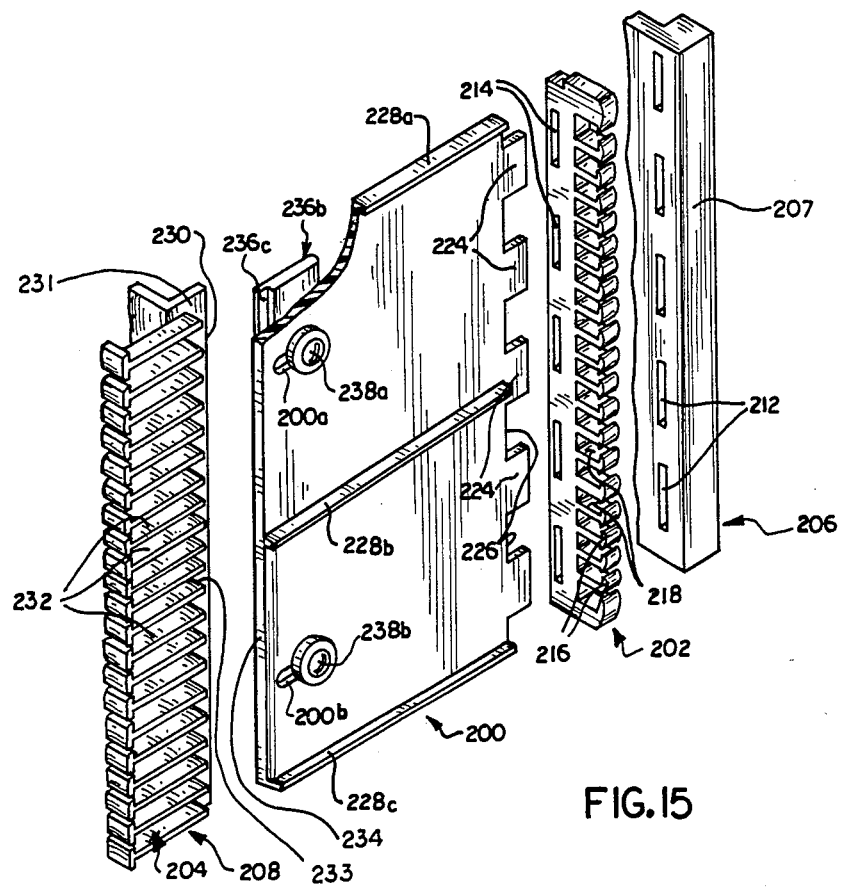
FIG. 15 is an exploded three dimensional view of the access panel and fanning strip of the present invention with parts removed.
Figure 16:
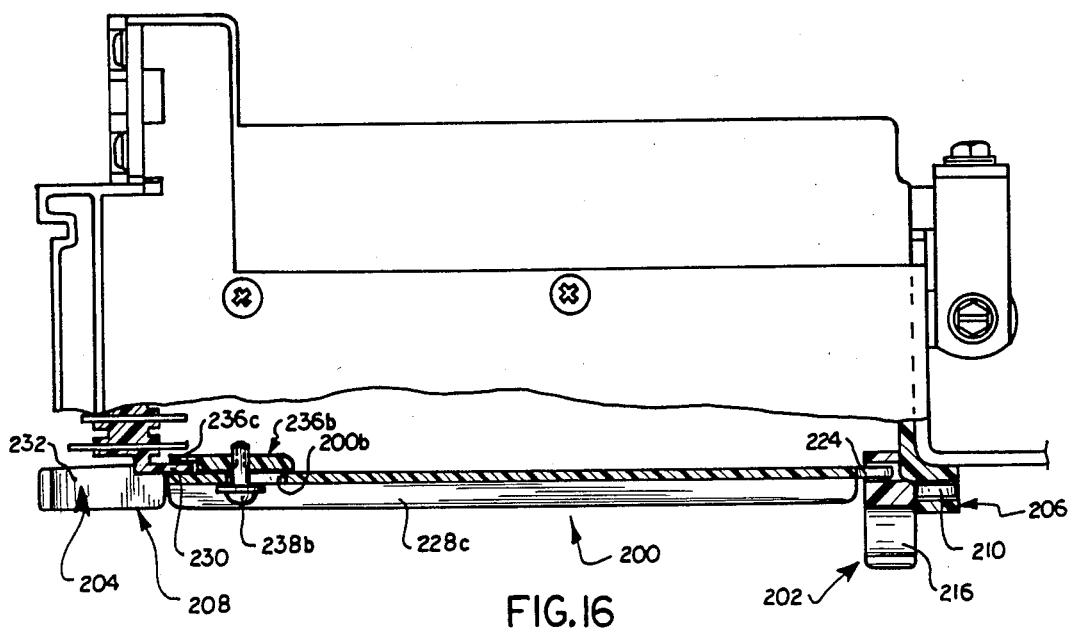
FIG. 16 is a section of FIG. 15.

Referring also to FIG. 2, the access panel 48 comprises a relatively flat, generally rectilinear sheet or panel. The panel securing means comprises a first hold-down strip 70 which defines a first channel means in the form of a plurality of spaced-apart elongate slots 72 in a side surface thereof. It will be noted that the hold-down strip 70 also defines or includes molded therewith a rear fanning strip 74. This fanning strip 74 is provided for guiding or "fanning out" a plurality of conductors or wires from inside equipment about the rear, right-hand side of the assembly 20, en route to the equipment field 60. Cooperatively, this first "channel" receives a complementary portion of the facing edge 76 of the panel 48. In the illustrated embodiment edge 76 will be seen to comprise a series of projections 78 and recesses 80 which are of complementary configuration and location for interfitting with the slots 72 of the hold-down strip 70.

The hold-down strip 70 is in turn coupled with a flared out, facing edge surface 64 of the module field block by a pair of fasteners 82 which are assembled in captive relatioship with apertures 84 therein and mate with complementary threaded openings 83 in the facing surface 64.

An opposite edge portion 86 of the access panel 48 is received in a second channel 88 defined at the opposite edge surface 66 of the enclosure, which comprises an end portion of the equipment field block 28. In the illustrated embodiment, this channel 88 is defined by the edge 66 which comprises an in-turned shoulder portion of field block 28 and by a plurality of fingers 90 on the other side. These fingers 90, with reference to FIG. 1 will be seen to comprise rearward extensions of a plurality of generally T-shaped members 92 which form or define a front fanning strip of the connector assembly. This front fanning strip guided the conductors from the rear fanning strip 74 to the equipment field 60.

Accordingly, it will be seen that the access panel 48 may be securely and yet removably mounted in a substantially flat condition over the otherwise open side of the assembly by initially interfitting the projections and recesses 78, 80 thereof with the slots 72 of the hold-down strip 70. Thereafter, the assembled panel 48 and strip 70 may be placed in a substantially flat condition at the open side surface of the assembly 20, whereupon the opposite edge 86 of the panel 48 may be slideably inserted, substantially along its entire edge, in the channel 88 just described. Thereupon, the captivated fasteners 82 may be inserted as previously described into the threaded openings 83 provided therefor in the facing surface 64. The panel 48 is then held in a substantially flat and secure conditions against the peripheral edge portions or surfaces 64 and 66. Advantageously both the panel 48 and rear fanning strip 74 may readily be removed (thus also moving aside the conductors received through the fanning strip 74) to allow access to the back plane wiring.

It will be noted that the frame member top and bottom wall portions 39 and 41 overlie the top and bottom edge portions of panel 48 to complete the enclosure, these latter walls 39 and 41 being of relatively rigid metallic material, thereby insuring the integrity of the enclosure thus formed. In this regard, it will also be noted that the module field block 24, test field block 26 and equipment field block 28, as well as access panel 48 and hold-down strip 70 are all preferably formed, as by molding, from a suitable non-conductive material and preferably a relatively rigid and moldable plastic material.

Referring now to FIGS. 4 through 6 inclusive, a novel grounding arrangement for the connector assembly of the invention will next be described. Initially referring to FIG. 5, it will be seen that each of the protector modules 25 carries, at a bottom portion thereof, a plurality of terminal members. A first pair of these terminals 98 are for receiving an incoming line pair, while a second pair 100 are for receiving a corresponding line pair from the inside equipment. The remaining terminal 102 is designated as the ground terminal, through which any over-voltage or current surge condition is to be discharged or dissipated. Accordingly, and referring to FIG. 4, the rear or back plane side of module field block 24 includes corresponding groups of five terminals each which are here designated by like reference numberals 98, 100, 102, together with the respective suffixes a, b and c.

Advantageously, a novel ground bus means or system is provided for electrically interconnecting all of these ground terminals which are located interiorally of the enclosure defined by the assembled connector assembly, 20, that is, in the back plane 54. In the illustrated embodiment, the novel ground bus system includes a first, generally centrally disposed bus member or bus bar 104 of a predetermined cross-section, preferably equivalent to No. 6 AWG solid wire size. This central conductor or ground bus 104 will be seen to run vertically and be generally centered with resepct to the ground plane 54. The module field block 24 is preferably provided with a corresponding groove or slot 106 (see FIG. 6) to receive the first bus bar 104. This bus bar 104 is provided with a plurality of generally circular slots or openings 107 in its upper surface which in turn receive generally cylindrical bus bars or conductive rods 108.

These latter bus bars or conductive rods 108 are coupled directly to respective ground terminals 102a, 102b, etc., as by soldering as indicated, for example, generally at 110. These latter bus bars 108 are preferably No. 12 AWG solid conductors. It will be noted with reference to FIG. 3 that a total of ten protector modules 25 are arranged in each horizontal row. Accordingly, no more than five of these ground terminals 102a, etc., are coupled to any given bus bar 108 before its junction with the larger center bus member 104. In this regard, the bars 108 are further coupled with the slots 107 which are formed to receive them in the rectangular center bus 104 by suitable means as by soldering as indicated generally at 112.

Advantageously, the ground bus system is carried exteriorally of the housing for grounding with the frame 22, which it will be remembered is mounted to a main distribution frame, which comprises what is known in the art as a "frame ground." Alternatively, as will be seen presently, a novel ground selecting means or assembly of the invention permits the connector ground to be carried to some ground other than, or isolated from, this frame ground, or what is generally known in the art as an "isolated ground."

Referring again to FIGS. 4 and 6, an additional bus bar member 114 is provided for carrying this ground connection exteriorally of the housing or enclosure defined by the assembled connector assembly. This latter bus bar 114 is also preferably equivalent in cross-section to No. 6 AWG solid wire size. A groove or channel 115 is provided in the module field block 24 to receive this second bus bar 114. Advantageously, it is relatively simply interfitted with the similarly dimensioned center bus bar 104 by providing identical slots in each of the bus bars 104 and 114 in a substantially "T-shaped" configuration, this junction being indicated generally by reference numeral 116 in FIG. 4 and in FIG. 6. Additionally, this connection may be further secured as by soldering as also indicated at 118 in FIG. 4.

Referring now to FIGS. 7 through 10, inclusive, the details of the ground selecting means of the illustrated embodiment will now be described. Initially, it will be noted that the structure to be next described comprises adjustable ground selecting means for alternatively coupling the ground bus means just described to one of the frame ground and a selected second ground, isolated from the frame ground.

Referring initially to FIGS. 7 and 9, as previously noted, the rear portion of the frame member 22 substantially overlies the module field block rear wall portion 46. In this regard, the module field block and the frame member define a further pair of aligned through openings 120, 122 in these rear surfaces thereof, through which a portion 126 of the ground bus 114 projects so as to carry the circuit ground exteriorally of the back plane or interior of the housing or enclosure. The through opening 122 of the module field block includes a raised peripheral lip portion 124 for electrically insulating or isolating the ground bus 114 and projecting portion 126 thereof from the metal frame 22.

The means for selecting one of the frame ground and isolating ground comprises an electrically conductive link means or assembly coupled with the projecting portion 126 of the ground bus 114, which is provided with a through opening or aperture 127 for this purpose. This electrically conductive link means or structure is indicated in FIGS. 3 and 10 generally by reference numeral 130. This link means is selectively movable between a first position wherein it may be electrically coupled to the frame member 22 and a second position wherein it is out of electrical contact with the frame member 22 and free to receive alternate grounding means such as one or more wires or cables 131 for electrically coupling with a selected isolated grounding means.

Moreover, the adjustable ground selecting means or assembly of FIG. 9 will be seen to be located at the rear side of the connector assembly 20, for example, as viewed in FIG. 1, that is, the side at which the stub or cable 31 is received and the side which is mounted to the main distribution frame. Generally speaking, access may be had to this rear side even when the assembly is mounted to the main equipment frame, as the mounting means (not shown) generally includes some hinge-like structure for swinging the connector assembly 20 to one side to gain access to the rear side thereof. Accordingly, the ground connection may by changed from a frame ground to an isolated ground even in the field.

Referring now more particularly to the structure of the link means or assembly 130, it will be seen that it includes a first generally right-angle link 132 which includes first and second legs 132a and 132b. The first leg 132a has a through aperture 134 alignable with the through aperture 127 of the projecting ground bus portion 126 to be coupled thereto by suitable means such as a screw and nut type fastener designated generally 138. The module field block rear side wall 46 further includes an outwardly projecting, electrically nonconductive support member 140 formed integrally therewith for supporting the second leg 132b. In the illustrated embodiment, the support member 140 is provided with a generally U-shaped slot 142 alignable with a second through aperture 143 in the leg 132b of the right-angle link 132 to receive a similar screw and nut type fastener 144.

The frame member 22 further includes an outwardly projecting electrically conductive grounding tab 146 integral therewith. This grounding tab 146 projects in generally side-by-side alignment with and is spaced apart from the projecting support member 140. The link means or assembly further includes a second substantially flat link member 150 which is of suitable length and selectively positionable for coupling the first link second leg 132b with the frame grounding tab 146. In the illustrated embodiment the flat link 150 and right-angle link 132 further include cooperating locking means for defining first and second positions of the link assembly as respectively illustrated in FIGS. 7 and 8. In the first position, illustrated in FIG. 7 (and in FIG. 10), the second link is positioned to complete the electrically conductive path between the first link second leg portion and the grounding tab. In the second position, illustrated in FIG. 8, the second link is positioned for projecting substantially oppositely outwardly from the support member 140 with respect to the location of grounding tab 146, to thereby receive alternate or isolated grounding means 131.

In the illustrated embodiment, this locking means comprises alignable through apertures in the first and second links for receiving the fastener assembly 144 therethrough. In this regard, an aperture 154 in the flat link 150 will be seen to be alignable with aperture 143 in first link 132 to receive the previously mentioned fastener assembly 144 therethrough as well. Additionally, a second through aperture 152 if provided in the second link which is spaced apart from the first aperture 154 and locatable in registry with a similar through aperture 147 in the grounding tab 146 to receive a similar screw and nut type fastener assembly 156 therethrough.

Moreover, in order to positively lock the flat link 150 in one or the other of the two positions illustrated respectively in FIGS. 7 and 8 additional locking means is provided. This additional locking means takes the form of an outwardly projecting locking tab 160 at an end portion of the right-angle link second leg 132b, and cooperating locking slots 162 and 164, which are generally rectangular in shape, formed in the flat link 150. In this regard, the first locking slot 162 is located intermediate the two fastener-receiving apertures 152 and 154, and this first slot 162 interlocks with the tab 160 when the link 150 is in the first position, as illustrated in FIG. 7 to achieve a frame ground.

The second locking slot 164 is formed in an end part of the link 150 and locks with the tab 160 when the link 150 is rotated by substantially 180 degrees to the second position, as illustrated in FIG. 8, to receive an isolated ground. In the isolated grounding position illustrated in FIG. 8, the screw and nut fastener 156 may be used to couple the wires or cables 131 or other suitable grounding means with the link 150 at through aperture 152 thereof.

Referring now to remaining FIGS. 12, 13 and 14, further novel features of the invention with respect to the assembly of the test field block 26 and equipment field block 28 with the frame 22 and module field block 24 will next be described.

As previously indicated with reference also to FIGS. 1 and 3, the test field block and equipment field block are mounted in a substantially side-by-side arrangement to generally define a front side of the connector assembly 20. This is done to promote ready access to the terminals of these two blocks for testing purposes and for connecting and disconnecting inside equipment respectively, when the connector assembly is mounted to the main distribution frame in the field. In this regard, it will be appreciated that a plurality of such connector assemblies may be mounted in vertical columns and horizontal rows on a given main distribution frame, whereby access for test purposes and equipment connection or disconnection purposes is most readily facilitated by arranging the test field block and equipment field block at the front side in this fashion. Many prior art arrangements have provided the test field block and equipment field block as a single, integrally molded member. However, in many instances it is desirable to provide a plurality of different terminal configurations for the external terminals or equipment field 60 of the field block 28. However, the test field block is generally provided as a single configuration to accept a complementary test shoe assembly.

Accordingly, the present invention advantageously provides an equipment field block 28 as a separate member, non-integral with the test field block 26. Moreover, the invention advantageously provides means for mounting the test field block and the equipment field block in such a way as to permit selective removal for repair or replacement of either thereof separately. At the same time, the mounting of these two blocks is such as to hold them in a side-by-side condition for together defining a front side of the connector assembly. This also permits equipment field blocks to be provided with a plurality of terminal or field configurations, without changing the exterior configuration thereof or the means provided for interfitting with the remainder of the connector assembly 20.

In the illustrated embodiment, the novel mounting means for the test field block and equipment field block include cooperating tongue and groove means on the abutting sides of the respective blocks for holding these abutting sides in alignment throughout a major fractional portion of their respective lengths. Referring to FIG. 3 and FIG. 14, it will be seen that abutting sides 26a and 28a of the test field block and equipment field block respectively are held in alignment by an outwardly projecting tongue or ridge 170 which interfits with a complementary configured groove, channel or slot 172 on the side 26a of the test field block. It will be noted that the ridge or tongue and the groove slot or channel each runs substantially the entire length of the side surface 26a or 28a of the respective block on which it is located.

As best seen in FIG. 14, the outer or opposite side 28b of the equipment field block 28 is held in place with respect to the frame 22 by a suitable fastener member or screw 174 which extends through an opening 173 in frame top wall 39 and into a threaded aperture 175 provided therefor in the facing surface of the block 28. A similar arrangement comprising a similar fastener or screw 174a and opening 173a is provided at the opposite or bottom wall 41 of the frame 22.

Referring to FIG. 11, the test field block is similarly coupled to an extension 39a of the top wall 39 of frame 22. In this regard, this extension 39a is provided with two downwardly depending tabs 176 which receive a top portion of the test field module flat thereagainst. To this end, the test field module top portion is provided with a pair of through apertures 178 for receiving suitable fasteners, for example, screws 180 therethrough to engage the tabs 176 which may be suitably internally threaded for this purpose. It will be appreciated that similar tabs 176a are located at a similar extension 41a of the bottom wall 41 of frame 22, which it will be remembered is substantially a mirror image of the top wall portion 39 thereof. Similar through apertures 178a and cooperating fasteners or screws 180a are provided at this bottom edge of test field block 26 as well.

In this regard, it is also noted that frame extensions 39a and 41a overlie edge portions of the module field block extensions or wall portions 38 and 40 to enclose the back plane 56 of the test field.

Also, a pair of small plates 181, 181a are mounted between the tabs 176, 176a and the test field block 26. These plates carry tapped bores 183, 183a, accessible through U-shaped slots 185, 185a in top and bottom edges of test field block 26 for receiving mating fasteners of the test shoe (not shown), which is used to test the lines as previously mentioned. Referring now to FIG. 3 and FIGS. 11, 12 and 13, in accordance with a further feature of the invention, stabilizing means are included for substantially preventing bowing out of the test field block relative to the adjacent edge 44 of the module field block.

It will be noted that the provision of the test field block and equipment field block as separate units results in a relatively elongate, narrow configuration of the test field block 26 as best viewed, for example, in FIG. 12. It will be remembered that the fasteners 178, 178a are utilized to mount the test field block to the frame member 22. Accordingly, the groove 172 which receives the complementary tongue portion 170 of the equipment field block serves to hold this side of test field block in substantially flat condition and in side-by-side alignment with the equipment field block. In this regard, these two blocks define and locate their respective fields in substantially parallel planes, which are relatively offset somewhat.

However, in view of the relatively great unsupported length of the test field block on the opposite side, that is, the side adjacent the wall portion 40 of module field block 24, there may be some tendency of the test field block to bow out somewhat at its medial portion. Accordingly, stabilizing means in the form of a tab 186 on the test field block and a complementary slot 188 on the wall portion 40 of module field block 24 are provided. In this regard, the slot 188 will be seen to comprise an elongate, relatively narrow through opening in the wall 40, which is spaced from the edge 42. This edge 42 will be remembered to be adjacent the test field block 26, and when assembled therewith abuts the overlying shoulder portion or edge 44 thereof. The tab 186 is substantially centrally located along the facing (with respect to wall 40) edge portion 187 of rear surface 184 of the test field block, located behind and spaced apart from the shoulder portion or edge 44. Hence, the spacing of slot 188 with respect to edge 42 corresponds to the spacing of tab 186, so that when the tab 186 is received therein, the shoulder 44 and edge 42 are held in abutting condition. The tab 186 is of complementary dimensions for interfitting with the slot 188.

Referring briefly to FIG. 13, some further details of the structure of the tab 186 are seen from a view of the rear or inside portion of the test field block 26. It will be noted that the rear or inner side of test field block 26, here designated generally by reference numeral 184, includes a plurality of generally cylindrical bosses, projections or "silos" 190. These slightly raised projections or silos are utilized to mount terminals so as to insure substantial electrical isolation or insulation between terminals. In this regard, the projecting nature of these silos is intended to provide a longer electrical discharge path and increased electrical insulation resistance between the respective terminals carried therein. However, in order to form the tab 186, which is located substantially behind the plan of the back surface 184, a plurality of the silos 190 along the medial edge part are formed in a semi-circular configuration, rather than as cylinders. These semi-circular projections serve essentially the same function along the edge 187 of surface 184, but permit the formation of the tab 186 thereupon substantially continuous with and supported by the material of the outer edges of the semi-circular projections 192.

From the foregoing, it will be seen that the novel construction of the frame member and respective field blocks of the invention and the novel means for assembly thereof define a surprisingly compact connector assembly. In this regard, it will be recalled that downsizing and other space saving measures are continuing objectives in the design of such connector assemblies. In particular, it will be noted that the novel provision of top and bottom surface portions 39 and 41 of the frame member 22 and the extensions 39a and 41a thereof, for respectively mounting the test field block and equipment field block, form an assembled connector of minimum height, while still maintaining terminals for up to 100 line pairs on the respective fields. Additionally, the arrangement of the module field block to receive protector modules in a ten-by-ten generally rectangular array minimizes the side area of the connector assembly. Also, the above-described flat access panel 48 and mounting thereof including the provision and location of respective front and rear fanning strips 92 and 74, also minimize the side-to-side thickness of the assembled connector assembly.

There has been shown in FIGS. 1, 2 and 3 an access panel 48 which acts as a cover for the otherwise open right side of connector assembly 20. As previously described removal of panel 48 can be accomplished by loosening captivated fasteners 82 in holddown strip 70 an amount sufficient such that the opposite edge 86 of panel 48 may be slidably removed from channel 88. In this manner access to the back plane wiring can be obtained. There is, however, a problem in removing access panel 48 once connector assembly 20 has been installed in the central office. The assembly is typically installed in a manner such that the loosening of captivated fasteners 82 is not easily accomplished. In addition, once the fasteners are loosened the panel is removed by first removing holddown strip 70 and then by sliding panel 48 towards the rear wall portion 27 of frame member 22 so that edge 86 disengages from channel 88. This sliding of the panel is also not easily accomplished once assembly 20 has been installed in the central office. Therefore assembly 20 should have an access panel which is easily removable after the assembly has been installed. Such an access panel and associated front and rear fanning strips are shown in FIGS. 15 to 21.

Referring now to the figures there is shown only those parts of assembly 20 which are necessary in order that the access panel 200 of the present invention be completely described. Panel 200 interconnects with rear and front fanning strips 202, 204, respectively, which are of a slightly different construction than the rear and front strips 74 and 92, respectively, shown in FIGS. 1 and 2. In addition, as the fanning strips are of a slightly different construction it is necessary that the module field and equipment field blocks 206, 208, respectively, be of slightly different construction than module field and equipment field blocks 24, 28, respectively, of FIG. 1. The remainder of assembly 20 is otherwise identical to that shown in FIGS. 1 to 14 and therefore for ease of illustration and description will not be shown in FIGS. 15 to 21 and described herein.

As described previously, rear fanning strip 74 was attached to the flared out facing edge surface 64 of the module field block 24 by the use of fasteners 82 which attached first holddown strip 70 to the block (see FIG. 2). As shown most clearly in FIG. 21, rear fanning strip 202 includes a multiplicity of complementary configured projections 210 which interact with the corresponding multiplicity of slots 212 in the L-shaped extension 207 (see FIG. 15) of the module field block 206. Therefore the rear fanning strip of the present invention is not attached to the module field block by the use of rotatable fasteners such as the screws 82 of FIG. 2.

As can be seen most clearly in FIGS. 20 and 21, rear fanning strip 202 also includes a multiplicity of slots 214 located in a portion 215 (see FIG. 21) of strip 202. Finally, rear fanning strip 202 also includes a multiplicity of fingers 216 which define the multiplicity of channels 218 which are used to guide or fan out the cable pairs associated with the inside equipment. The projections 210 project outwardly from a portion 219 of strip 202, the fingers 216 projecting outwardly at right angles to projections 210. The portion 215 of the strip in which slots 214 are located may be recessed from the portion 219 of the strip in which projections 210 are located. It is that embodiment of strip 202 which is shown in FIGS. 20 and 21, a simplified version of the strip being shown in FIG. 15. When the projection 210 of strip 202 are interfitted with slots 212 of module field block 206, portion 220 projects inwardly along module field wall 46 toward back plane 54 (see FIG. 3) of the module field block.

Access panel 200, as best seen in FIG. 17, is substantially similar to access panel 48 in that it is essentially rectangular in shape and has a facing edge 222 which is identical in shape to facing edge 76 of panel 48. Facing edge 222 has a multiplicity of projections 224 and recesses 226 which are of complementary configuration and location for interfitting with slots 214 of fanning strip 202. Panel 200 also includes upper, middle and lower ribs 228a, b, c, respectively, which are parallel to each other and provide rigidity to the panel.

As described previously, the front fanning strip 92 which is associated with panel 48 (see FIG. 3) includes a channel 88 which is defined by edge surface 66 of the enclosure and by a plurality of fingers 90. An opposite edge portion 86 of panel 48 is received in channel 88. Fanning strip 204 of the present invention includes an edge surface 230 which corresponds to edge surface 66, but the T-shaped members 232 do not extend all the way to edge surface 230. Rather their extension stops short of edge surface 230 thereby leaving that portion of the extending part 231 of the fanning strip 204 which lies between the edge 233 formed by the furthest rearward extension of members 232 and edge surface 230 with a thickness equal only to the thickness of the material out of which part 231 is made. Therefore front fanning strip 204 does not have a channel in the manner of channel 88 of strip 92 to receive the opposite edge portion 234 of panel 200. Thus, panel 200 must include means by which the panel can engage edge surface 230 in order that the panel may be securely and yet removably mounted in a substantially flat condition over the otherwise open side of the assembly.

Such a means is provided in the form of slidably engageable clamping strip 236. As can best be seen by referring to FIGS. 16, 18 and 19, strip 236 consists of a first face 236a which is of a predetermined width and a second face 236b which has a predetermined width which is wider than the width of face 236a. This difference in widths gives rise to a lip or projection 236c on strip 236. It is lip 236c which is brought into overlapping engagement with edge surface 230 to thereby provide the means by which panel 200 can be securely and yet removably mounted over the open side of the assembly. Strip 236 includes top and bottom apertures 236d and 236e. Panel 200 includes top and bottom elongate slots 200a and 200b which are complementary to apertures 236d and 236e respectively. The slots are located on panel 200 close to facing edge 234 of panel 200. A pair of fasteners 238a and 238b are associated with slot 200a and aperture 236d; and slot 200b and aperture 236e, respectively. The fasteners retain strip 236 in relationship to panel 200. Loosening the fasteners allows strip 236 to be slid to the left to thereby allow lip 236c to engage edge surface 230 in an overlappiing manner. Tightening the fasteners then provides the force by which the lip clamps the edge surface.

Accordingly, it will be seen that the access panel 200 may be securely and yet removably mounted in a substantially flat condition over the otherwise open side of the assembly by initially interfitting the projections and recesses 224, 226 thereof with the slots 214 of fanning strip 202. Thereafter, the assembled panel 200 and strip 202 may be placed in a substantially flat condition at the open side surface of the assembly 20, whereupon projections 210 of strip 202 may be interfitted with corresponding slots 212 of module field block 206. Clamping strip 236 may then be slid to the left. Fasteners 238a, b must be sufficiently loosened to allow such sliding action to take place. When lip 236c overlaps edge surface 230 of fanning strip 204, the fasteners may then be tightened to hold the panel in a substantially flat and secure condition over the otherwise open side of the assembly. Advantageously access panel 200 can be easily removed once assembly 20 has been installed simply by loosening fasteners 238a, b such that strip 236 may be slid to the right an amount sufficient to cause lip 236c to no longer be in overlapping engagement with edge surface 230. This allows the panel and the rear fanning strip to be readily removable thereby allowing access to the back plane wiring.

What has been illustrated and described herein is a novel and improved telephone distribution frame connecor assembly. While the invention has been illustrated and described herein with reference to a preferred embodiment, the invention is not limited thereto. Those skilled in the art may devise various alternatives, changes and modifications upon reading the foregoing description. The invention includes such alternatives, changes and modifications insofar as they all within the spirit and scope of the appended claims.

What is claimed is:

1. A telephone distribution frame connector assembly comprising:
    (a) an insulating connector block having a front face, a rear face, and opposed side faces, one of said side faces being open, said front face having a portion which extends over a part of said open side face and projects towards said rear face;
    (b) means for mounting said block on a distribution frame such that said rear face is adjacent to said frame and said front face is remote from said frame; and
    (c) fanning strip and access panel means for normally covering said open side face and having a first side surface and a first side edge opposite thereto and including a plurality of outward projecting means on said first side surface, an extension portion of said rear face having a side surface, said rear face extension portion side surface having therein complementary means for slidably receiviing said plurality of outward projecting means to thereby form a non-rotatable nonlocking fastener when said plurality of outward projecting means are inserted in said complementary receiving means such that said fanning strip and access panel means is removably attached to said rear face, said fanning strip and access panel means further including, adjacent to said first side edge, means for mounting thereon a locking means, said mounting means allowing said locking means to be slid towards said front face for engaging said front face extending portion, a portion of said fanning strip and access panel means between said first side edge and said mounting means also engaging said front face extending portion such that said fanning strip and access panel means is mounted in a substantially flat condition over said open side face and said fanning strip and access panel means is held in place when said locking means is slid into engagement with said front face extending portion and is locked.

2. The frame connector assembly of claim 1 wherein said fanning strip and access panel means comprise a fanning strip having said first side surface and a second side surface, and an access panel having said first side edge and a second side edge opposite thereto and including a plurality of outward projecting means on said second side edge, said fanning strip having complementary means in said second side surface for slidably receiving said access panel second side edge plurality of outward projecting means to thereby form a non-rotatable non-locking fastener when said second side edge plurality of projecting means are inserted in said fanning strip complementary means, said access panel also having said mounting means adjacent to said first side edge.

3. The frame connector assembly of claim 1, wherein said locking means comprises lockable fastener means slidably mounted in said mounting means and clamping means attached to said slidably mounted lockable fastener means, said clamping means engaging said front face extending portion when said locking means is slid into engagement with said front face extending portion.

4. The frame connector assembly of claim 3 wherein said slidably mounted lockable fastener means are rotatable fasteners and said mounting means are slot means, said rotatable fasteners passing through said slot means.

5. The frame connector assembly of claim 2 wherein said locking means comprises lockable fastener means slidably mounted in said mounting means and clamping means attached to said slidably mounted lockable fastener means, said clamping means engaging said front face extending portion when said locking means is slid into engagement with said front face extending portion.

6. The frame connector assembly of claim 5 wherein said slidably mounted lockable fastener means comprises rotatable fasteners and said mounting means are slot means, said rotable fasteners passing through said slot means to.

7. The frame connector assembly of claim 1 wherein said plurality of outward projecting means are projections having a predetermined shape.

8. The frame connector assembly of claim 2 wherein said plurality of outward projecting means on both said fanning strip and said access panel are projections having a predetermined shape.

9. A telephone distribution frame connector assembly comprising:
    (a) an insulating connector block having a front face a rear face, and opposed side faces, one of said side faces being open, said front face having a portion which extends over a part of said open side face and projects towards said rear face;
    (b) means for mounting said block on a distribution frame such that said rear face is adjacent to said frame and said front face is remote from said frame;
    (c) a fanning strip having first and second side surfaces, said fanning strip including a plurality of outward projecting means on said first side surface, an extension portion of said rear face having a side surface, said side surface having therein complementary means for slidably receiving said plurality of outward projecting means to thereby for a non-rotatable nonlocking fastener when said plurality of projecting means are inserted in said complementary receiving means such that said fanning strip is removably attached to said rear face; and
    (d) an access panel for normally covering said open side face, said panel having a first side edge and a second side edge opposite thereto and including a plurality of outward projecting means on said second side edge, said fanning strip having complementary means in said second side surface for slidably receiving said access panel first side edge plurality of outward projecting means to thereby form a non-rotatable nonlocking fastener when said plurality of outward projecting means are inserted in said fanning strip second surface complementary means such that said access panel is removably attached to said fanning strip, said access panel including, adjacent to said first side edge, means for mounting thereon a locking means, said mounting means allowing said locking means to be slid toward said front face for engaging said front face extending portion, a portion of said access panel between said first side edge and said mounting means also engaging said front face extending portion such that said access panel is mounted in a substantially flat condition over said open side face and both said access panel and said rear fanning strip are held in place when said locking means is slid into engagement with said front face extending portion and is locked.

10. The frame connector assembly of claim 9 wherein said locking means comprises lockable fastener means slidably mounted in said mounting means and clamping means attached to said slidably mounted lockable fastener means, said clamping means engaging said front face extending portion when said locking means is slid into engagement with said front face extending portion.

11. The frame connector assembly of claim 10 wherein said slidably mounted lockable fastener means are rotatable fasteners and said mounting means are slot means, said rotatable fasteners passing through said slot means.

12. The frame connector assembly of claim 9 wherein said fanning strip edge portion outward projecting means are projections having a first predetermined shape.

13. The frame connector assembly of claim 12 wherein said access panel outward projecting means are projections having a second predetermined shape.

14. The frame connector assembly of claim 13 wherein said first and said second predetermined shapes are essentially identical.

15. The frame connector assembly of claim 14 wherein said essentially identical shapes are rectangular.

* * * * *